United States Patent Office 3,772,261
Patented Nov. 13, 1973

3,772,261
DIRECT PREPARATION OF POLY-OLEFIN POWDERS
Volkert Faltings, Gelsenkirchen-Buer, Klaus Doerk, Dortsen, Klaus Koch, Gelsenkirchen-Buer-Reese, and Richard Schaaf, Altendorf-Ulfkotte, Germany, assignors to Scholven-Chemie Aktiengesellschaft
No Drawing. Filed June 30, 1969, Ser. No. 837,955
Claims priority, application Germany, July 2, 1968, P 17 70 765.2
Int. Cl. C08f 1/28, 3/06, 3/10
U.S. Cl. 260—94.9 DA
5 Claims

ABSTRACT OF THE DISCLOSURE

Ethylene and/or $\alpha$-olefins are polymerized in a Ziegler-type polymerization with the catalyst being carried on a finely-divided particulate support which becomes incorporated in the polymerized product. The particles of the polymerized product are of the same uniform shape as the support but are larger in size. A free-flowing powdered product is obtained which can be directly converted to finished products without the need to remove the support material.

---

It is advantageous to use as a support material a powder polyolefin as this reduces the ash content of the finished product.

PRIOR ART

It is known that ethylene and $\alpha$-olefins polymerize to form products of high molecular weight in the presence of catalysts composed of transition metal compounds of Sub-groups IV to VI of the Periodic System having an oxidation stage that is lower than the maximum, and of organometallic compounds of main Groups I to III of the Periodic System. The transition metal components of the catalyst may be carried on a support for the purpose of increasing the catalyst activity, such as calcium chloride or magnesium oxychloride or polyolefins.

THIS INVENTION

It has now been found that such supported olefin polymerization catalysts can be used advantageously to directly produce polyolefin powders which, due to their ability to flow or their free-flowing qualities and their high bulk density, are directly suitable for further working on conventional plastics fabricating machines without the need to remove the catalyst support material.

If suitable support materials are used, it is possible to produce a free-flowing polyolefin powder of high bulk density having a specific desired particle size distribution and regular particle shape, in a controlled manner.

In brief compass, this invention is a process for the polymerization of ethylene and/or $\alpha$-olefins in a liquid or gaseous phase, with the use of catalysts made of compounds of transition metals of Sub-groups IV to VI of the Periodic System in an oxidation stage that is lower than the maximum, and organo-metallic compounds of main Groups I to III of the Periodic System, characterized in that a catalyst is used whose transition metal component has been applied to an inorganic or organic support material that is in powder form, the powdered support being used in the same uniform particle shape that is to be given, in larger size, to the finished polymer.

If the support is a polyolefin powder the particle diameter of the support material depends to a great extent on the polymerization conditions, such as pressure, temperature, catalyst concentration on the support material, and the detention time.

By the polymerization process of the invention it is possible to produce in a controlled manner polyolefin powders having outstanding flowing or free-flowing qualities and high bulk density, and which consequently can be worked immediately, without feeding difficulties, on conventional plastics fabricating machinery, avoiding the necessity of special preliminary processes such as compression or granulation.

Suitable support materials for the transition component of the catalyst for the process of the invention are powdered materials having a narrow range of particle sizes and a regular, preferably lens-shaped or spherical particle form.

It is especially advantageous if the support materials and polymer are chemically identical, i.e., when a catalyst is used, for example, for the polymerization of ethylene, in which the transition metal component is applied to polyethylene as the support. In this case polymers having lower ash contents are obtained than when inorganic supports are used, and the support does not have to be removed, and there is the additional advantage that the support consists of the same type of material.

Polyethylene powders that are suitable as support materials can be prepared, for example, by the polymerization of ethylene with titanium trichloride and tri-alkyl aluminum, if a titanium trichloride is used in which the titanium trichloride particles are of a substantially uniform size and regular shape, this being brought about, for example, by maintaining constant reaction conditions while the titanium tetrachloride is being reduced in a known manner, or by grinding and screening or otherwise treating the prepared titanium trichloride.

Not only polyethylene, but other appropriately prepared polyolefins, such as polypropylene, for example, can be used according to the invention as organic support materials.

The application of the transition metal component to the support is expediently performed by taking the transition metal component in the maximum oxidation stage and reducing it with an organometallic compound in an inert solvent in the presence of the support, and then removing the solvent by evaporation. Often it is also advisable, prior to the application of the transition metal component, to treat the support material with an aluminum alkyl to remove undesirable polar impurities. The transition metal component applied to the support is activated, before it is used for the polymerization, with an organometallic compound of main Groups I to III of the Periodic System, preferably an aluminum alkyl.

The process of the invention can be used to advantage either in an inert hydrocarbon under the usual conditions of Ziegler polymerization, or in the gaseous phase in a fluidized bed.

According to the invention it is possible to produce polyolefin powders having outstanding flowing or free flowing qualities and high bulk density and which consequently can be worked immediately, without feeding difficulties, on conventional plastics fabricating machinery, by means of catalysts, which without support after the invention produce polyolefins with unsatisfactory powder properties.

EXAMPLE 1

(a) The catalyst is prepared as follows: 200 g. of a uniform, free flowing, spherical polyethylene powder (bulk weight 410 g./l., particle size 250–500$\mu$; the particle size of 80% by weight of powder ranged from 250 to 300$\mu$) is stirred in a vessel that is free of oxygen and water with a solution of 3.5 g. of a mixture of $VOCl_3$ and $Ti(O-nC_3H_7)_4$ (molar ratio Ti/V=1:3) in 90 ml. of a mixture of saturated aliphatic hydrocarbons having a boiling range from 60 to 85° C., for approximately 15 minutes. Then, over a period of one hour, 6.0 g. of diethyl aluminum chloride dissolved in 90 ml. of the above-mentioned hydrocarbon mixture is added at 25–30° C. When this drop-by-drop addition is completed, the suspension is stirred for 30 minutes at room temperature, and then for another 60 minutes at 60° C. The support catalyst is separated from the mother liquor by filtration and freed of the secondary products of the reaction by washing with the above-mentioned hydrocarbon. The remainder of the hydrocarbon mixture is removed by vacuum drying at 60–100° C.

(b) For the polymerization, 5 g. of the above-prepared catalyst and 1 g. of aluminum triethyl are added to 1000 ml. of the above-named hydrocarbon under nitrogen in an autoclave at 60° C. Then 3 atmospheres of hydrogen and 6 atmospheres of ethylene are pumped in. The immediate onset of polymerization is indicated by a rapid drop in pressure. The temperature rises and is adjusted to 75° C. The polymerization pressure is held constant at 10 atm. by pumping in ethylene to make up for what has been consumed. After one hour of polymerization, the reaction is stopped by the addition of 50 ml. of n-propanol through a pressure lock. The polyethylene formed occurs in the form of a coarsely granular, easily filterable material. After it has been suction filtered and repeatedly washed with a propanolhexane mixture to remove catalyst residues, it is vacuum dried for 6 hours at 80° C. 120 g. of a coarsely granular polymer is obtained having a reduced viscosity of 3.7. The grain size of the polymer ranges between about 250 and 1500$\mu$, 80% by weight ranging between 500 and 1000$\mu$. The bulk weight of the polyethylene powder thus prepared is about 460 g./l.; the powder has excellent free-flowing qualities. Upon a microscopic comparison of the polyethylene powder product with the support material used in the preparation of the catalyst, the great similarity is striking.

EXAMPLE 2

The catalyst is prepared as described in Example 1.

20 g. of the supported catalyst is poured into a fluidized bed reactor. The polymerization is performed at atmospheric pressure and the ethylene gas flow is adjusted to a fluidization rate of 0.2 m./sec. Over a period of one hour, 200 mg. of $Al(i-C_4H_9)_3$ is injected into the ethylene stream at 70° C. by means of an injection syringe. The onset of polymerization is indicated by an elevation of the gas discharge temperature by 20 to 25° C. After one hour the polymerization is stopped. 127 g. of a polymer having a reduced viscosity of 8.7 is obtained. The bulk density of the polymer amounts to 435 g./l. The powder has a very good free-flowing quality.

EXAMPLE 3

(a) The catalyst is prepared as follows: In a vessel that is free of oxygen and water 100 g. of a uniform, free flowing spherical polypropylene powder (bulk weight: 450 g./l., particle size: 250–300$\mu$) are stirred with a solution of 10 g. of $TiCl_4$ in 90 ml. of a mixture of saturated aliphatic hydrocarbons having a boiling range from 100–120° C., for approximately 20 minutes. Then, over a period of one hour, 12.0 g. of diethylaluminum chloride dissolved in 90 ml. of the above mentioned hydrocarbon mixture are added at 30° C. When the dropwise addition is completed, the suspension is stirred for 30 minutes. This catalyst suspension is then stirred for 5 hours at a temperature of 80° C. The supported catalyst is separated from the mother liquor by filtration and freed of the secondary products of the reaction by washing with the above mentioned hydrocarbons. The remainder of the hydrocarbon mixture is removed by vacuum-drying at 80° C.

(b) For the polymerization 10 g. of the above prepared catalyst and 1 g. of diethyl aluminum chloride are added to 1000 ml. of the above mentioned hydrocarbon mixture in an autoclave at 75° C. Then 150 ml. of hydrogen are added and then propylene until a pressure of 5 atmospheres is reached. The pressure is kept constant. After 2 hours the polymerization is stopped by adding 50 ml. of isopropyl alcohol. The polymer is removed from the reaction slurry by filtration and is washed to free it of the catalyst residue. 95 g. of a coarsely granular polymer are obtained having a reduced viscosity of 4.2. The grain size of the polymer ranges between 450–480$\mu$, 80% by weight ranging between 450–700$\mu$. The bulk weight of the propylene powder thus prepared is about 430 g./l. The powder has excellent free-flowing properties.

EXAMPLE 4

(a) The catalyst is prepared as described in Example 1.

(b) For the polymerization 10 g. of the above prepared catalyst and 1 g. of $Al(i-C_4H_9)_3$ are added to 1000 ml. of a mixture of saturated aliphatic hydrocarbons having a boiling range from 60 to 85° C. under nitrogen in an autoclave at 10° C. At this temperature 30 g. of liquid butene-1 are added. Then hydrogen is added until 3 atmospheres are reached. A final pressure of 10 atmospheres is reached by the addition of ethylene. The polymerization starts immediately and the temperature rises and is kept at 75° C. The pressure is kept constant. After one hour of polymerization, the reaction is stopped by the addition of 50 ml. of isopropyl alcohol through a pressure lock. The polymer is treated as described in Example 3, 245 g. of a coarsely granular polymer are obtained having a reduced viscosity of 2.9. The grain size of the polymer ranges between 650–1500$\mu$, 80% by weight ranging between 650–1000$\mu$. The bulk weight of the polymer thus prepared is about 440 g./l. The powder has excellent free-flowing qualities and a microscopic comparison of the polymer with the support material shows a striking similarity.

What is claimed is:

1. In a process wherein ethylene or a lower $\alpha$-olefin or a mixture thereof is polymerized in the presence of a catalyst comprising compounds of transition metals of Subgroups IV to VI of the Periodic System in a lower than maximum oxidation stage and of organo-metallic compounds of main Groups I to III of the Periodic Systems; said catalyst being supported on polyolefin particles, the improvement comprising using as said polyolefin support particles which are spherical or lens-shaped and which are free-flowing and have a bulk density of about 410 to 450 g./l., whereby the polymer produced is also free-flowing, of high bulk density and capable of being formed into shaped structures without granulation.

2. The process of claim 1 wherein said ethylene is polymerized and the material of said support is polyethylene.

3. The process of claim 1 wherein said $\alpha$-olefin is propylene and the material of said support is polypropylene.

4. The process of claim 1 wherein said product is forced into a formed particle that includes the original support material without intermediate granulation.

5. The process of claim 1 wherein said polyolefin support particles are of about 250 to 500$\mu$ in diameter.

References Cited

UNITED STATES PATENTS

| | | | |
|---|---|---|---|
| 2,971,951 | 2/1961 | Cines | 260—94.9 M |
| 3,280,090 | 10/1966 | Scoggin | 260—94.9 M |
| 3,300,457 | 1/1967 | Schmid et al. | 260—94.9 B |

FOREIGN PATENTS

| | | | |
|---|---|---|---|
| 1,290,555 | 3/1962 | France | 260—94.9 P |
| 869,311 | 5/1961 | Great Britain | 260—94.9 P |

JOSEPH L. SCHOFER, Primary Examiner

A. HOLLER, Assistant Examiner

U.S. Cl. X.R.

260—88.2 B, 93.7